US005702091A

United States Patent [19]

[11] Patent Number: 5,702,091

[45] Date of Patent: Dec. 30, 1997

Perrin et al.

[54] GAS SPRING

[75] Inventors: Etienne Perrin, Pirey; Dominique Dony, Braillans, both of France

[73] Assignee: Draftex Industries Limited, Edinburgh, Scotland

[21] Appl. No.: 680,228

[22] Filed: Jul. 11, 1996

[30] Foreign Application Priority Data

Jul. 13, 1995 [GB] United Kingdom .................. 9514328

[51] Int. Cl.$^6$ .................................. F16F 9/02; F16F 9/32

[52] U.S. Cl. ........................ 267/64.12; 188/280; 188/288; 188/300; 267/64.11; 267/120; 267/124

[58] Field of Search .................................... 188/288, 284, 188/280, 300; 267/64.11, 64.12, 120, 124; 16/66, 84; 280/711

[56] References Cited

U.S. PATENT DOCUMENTS

| | | | |
|---|---|---|---|
| 3,938,793 | 2/1976 | Kaptanis et al. | 267/120 |
| 3,963,227 | 6/1976 | Mölders | 267/120 |
| 4,066,279 | 1/1978 | Kaptanis | 267/64.11 |
| 4,230,309 | 10/1980 | Schnitzius | 267/120 |
| 4,383,595 | 5/1983 | Schnitzius | 188/284 |
| 4,595,182 | 6/1986 | Freitag et al. | 267/120 |
| 5,157,806 | 10/1992 | Wartian . | |

FOREIGN PATENT DOCUMENTS

| | | | |
|---|---|---|---|
| 3546236 | 7/1987 | Germany . | |
| 61-290247 | 12/1986 | Japan | 188/284 |
| 1528820 | 10/1978 | United Kingdom . | |

*Primary Examiner*—Douglas C. Butler
*Attorney, Agent, or Firm*—Leydig, Voit & Mayer, LTD.

[57] ABSTRACT

A gas spring for the hatchback or other closure member of a motor vehicle body automatically stops at an intermediate position between the fully closed and fully opened positions. A piston carrying a piston rod separates the interior of a cylindrical body into first and second chambers. Gas under pressure forces the piston and piston rod towards the extended position to open the closure member, a restricted gas path through a groove in the cylinder wall allowing gas to flow from the second chamber to the first chamber. A third chamber is also defined within the cylinder and has an uninterrupted wall portion and a wall portion incorporating a groove. The third chamber is on the opposite side of the second chamber to the first chamber and has a smaller diameter than the first and second chambers. When the piston rod moves a sealing ring into the third chamber and also into contact with the uninterrupted wall portion, the third chamber is completely closed off; pressure build-up therefore arrests the movement of the piston rod at the intermediate position. Manual movement of the piston rod beyond this intermediate position moves the sealing ring over the groove in the third chamber, whereupon gas pressure acting on the piston now moves the piston rod to the fully extended position, gas flow being permitted from the third chamber to the second chamber through the groove in the third chamber. During closure of the hatchback, frictional engagement between the sealing ring and the smooth wall portion of the third chamber moves the sealing ring sideways into a position in which it allows gas flow between the third and second chambers.

18 Claims, 3 Drawing Sheets

GAS SPRING

BACKGROUND OF THE INVENTION

The invention relates to gas compression springs such as for moving a spring member from a first position corresponding to compression of the spring to a second position. Such a member may be a hatchback door or luggage compartment lid on an automobile for example.

A known form of gas spring comprises a piston-cylinder arrangement with a piston rod slidingly and sealingly extending outwardly of a first end of the cylinder; the distal end of the piston rod and the second end of the cylinder being adapted for connection between the body and the member; the interior of the cylinder being filled with gas under pressure; piston means carried by the piston rod and slidable within the cylinder; first gas flow means providing a restrictive gas flow path permitting limited flow of gas from one side of the piston means to the other as the gas pressure exerted on the piston rod moves the piston rod from an inner piston rod position towards an outer piston rod position more outwardly from the cylinder, whereby to move the member towards the second position; gas flow blocking means operated by the piston means when the piston rod has reached an intermediate position between the inner and outer piston rod positions to cause a block in the said gas flow path and thereby to cause a pressure build-up halting movement of the piston rod at the intermediate position; and second gas flow means operative when a change in an external force applied to the piston rod has caused the piston rod to move further outwardly of the cylinder to unblock the said gas flow path whereby to allow the piston rod to move into the said outer piston rod position.

Such a gas spring is known from U.K. Patent Application No. 1,528,820. In this known gas spring, the interior wall of the cylinder has first and second longitudinally directed grooves spaced apart axially by a short ungrooved portion. As the piston means moves along the first groove in response to the gas pressure, towards the outer piston rod position, the gas pressure can transfer around the piston means through this groove. When the piston means reaches the ungrooved portion, however, gas pressure transfer stops and the piston rod is thus halted in the intermediate position. An externally applied force must than be applied to move the piston means across the ungrooved portion, against the gas pressure, until the piston means reaches the second groove, whereafter the gas pressure moves the piston rod towards the outer piston rod position. A significant external force must be applied and is difficult to adjust. The invention aims to deal with this problem.

BRIEF SUMMARY OF THE INVENTION

According to the invention, the known gas spring is characterised in that the piston means comprises first and second pistons, the first piston dividing the interior of the cylinder into a first chamber closed by the head of the first piston and a second chamber through which the piston rod extends and in which the second piston is positioned; by means defining a third chamber in which the second piston reaches a predetermined position when the piston rod has reached the intermediate position; the first gas flow means including first interconnection means interconnecting the third chamber and the second chamber and second interconnection means interconnecting the second and first chambers; the gas flow blocking means comprising means forming part of the second piston and blocking the passage of gas through the first interconnection means when the second piston reaches the predetermined position within the third chamber, whereby to produce the said pressure build-up in the third chamber and thus a corresponding force opposing the force which is produced on the first piston by the gas pressure in the first and second chambers interconnected by the second interconnection means and which tends to move the piston rod to the outer piston rod position.

In the gas spring according to the invention, therefore, the piston rod is halted in the intermediate position because the pressure build-up in the third chamber balances the force still being produced by the gas pressure acting on the first piston. The change in externally applied force necessary to allow the piston rod to move towards the outer piston rod position is reduced and is more easily controllable.

Also according to the invention, there is provided a gas compression spring for moving a substantially horizontally pivotted closure member on an automobile body from a fully closed position corresponding to compression of the spring to a fully open position, comprising: a cylinder having a first, closed-off, end carrying a fixture for connecting the cylinder to one of the body and the closure member and a second, opposite, end; a piston rod sealingly protruding through the opposite end of the cylinder and carrying a fixture for connecting the piston rod to the other of the body and the closure member, the piston rod being connected to a piston slidable within the cylinder, the piston having a head defining a first chamber in the cylinder between the head of the piston and the first cylinder end, the piston defining a second chamber through which the piston rod extends; means in the cylinder defining a third chamber nearer to the second end of the cylinder than the second chamber; the third chamber having an open mouth communicating with the second chamber and through which mouth the piston rod extends; the interior of the cylinder being charged with gas under pressure so that the force of the gas moves the piston rod from a retracted position inwardly of the cylinder towards an extended position; first gas flow means providing a first restricted gas flow path allowing gas to flow from the second chamber to the first chamber to facilitate such movement; first and second seal producing means respectively carried by the piston rod and by the interior surface of the third chamber and so positioned as to act mutually to form a temporary seal which seals off the interior of the third chamber from the second chamber when the piston rod in moving towards the extended position has reached a predetermined intermediate position between the retracted and extended positions, whereby the resulting build-up of gas pressure within the third chamber stops further movement of the piston rod towards the extended position; and second gas flow means providing a second restricted gas flow path which connects the interior of the third chamber to the second chamber when the piston rod has been moved beyond the predetermined position towards the extended position by an externally applied force, whereby gas flow from the third chamber to the second chamber is permitted by the second gas flow means and causes the gas pressure within the interior of the cylinder to move the piston rod into the extended position.

BRIEF DESCRIPTION OF THE DRAWINGS

Gas springs embodying the invention will now be described, by way of example only, with reference to the accompanying diagrammatic drawings in which.

DESCRIPTION OF PREFERRED EMBODIMENTS

Figures 1, 2, 3, 9:
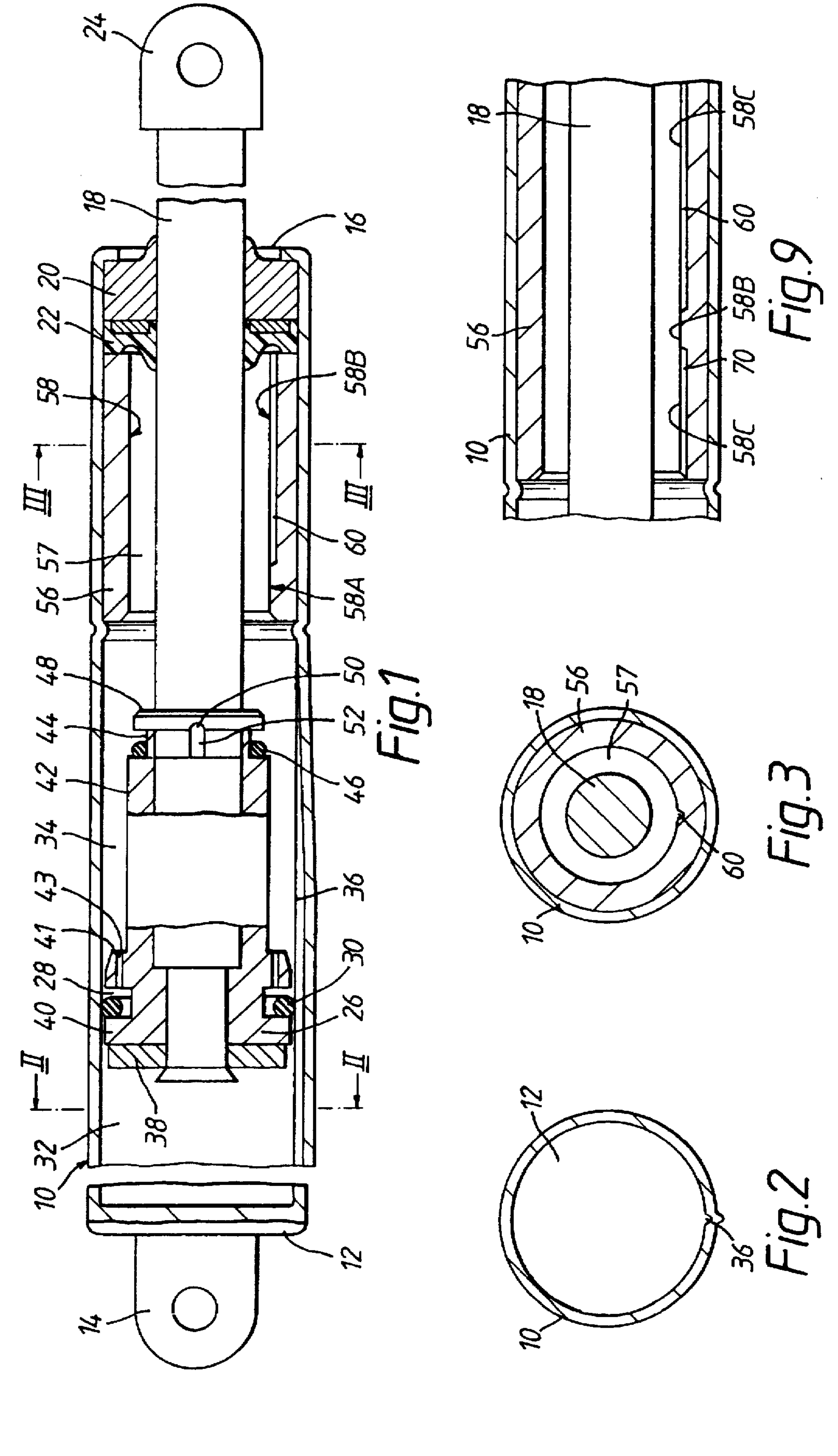
FIG. 1 is a longitudinal section through one of the gas springs.
FIG. 2 is a section on the line II—II of FIG. 1.
FIG. 3 is a cross-section on a line III—III of FIG. 1.
FIG. 9 is a partial longitudinal section corresponding to FIG. 1 but showing a further modification.

Referring to FIG. 1, the gas spring comprises a cylindrical body 10 having a closed end 12 on which is mounted a fixture 14. The opposite end of the cylinder is closed off by an integral cap 16 which is apertured to allow passage of a piston rod 18. The piston rod 18 slides in a guide 20 and through an airtight seal 22. The piston rod carries a fixture 24.

In use, the gas spring is mounted on a vehicle body so as to control the pivotting movement of a horizontally pivotted closure member such as the hatchback, the lid of a luggage compartment, or the bonnet of the engine compartment. One of the fixtures 14,24 is attached to the body of the vehicle and the other is attached to the hatchback (or other movable member). The gas spring may, however, be used in many other applications.

Within the cylinder 10, the piston rod is attached to a piston 26 which is provided with a circular groove 28 in which is located a sealing ring 30. The piston and the sealing ring 30 separate first and second chambers 32 and 34 within the cylinder. However, these chambers 32,34 are interconnected by a groove 36 (see FIG. 2 also) in the wall of the cylinder. As shown in FIG. 1, this groove 36 is of reducing cross-sectional area in the direction towards the end 16 of the cylinder.

The piston 26 has a head 38 and a body 40 carrying a shoulder 41. The body 40 has a cylindrical extension 42 rigid with and sealed to the outside of the piston rod 18. At its end opposite to the head 38 of the piston, the cylindrical extension 42 is provided with a circular channel 44 in which is seated a sealing ring 46. The channel 44 is defined between the end face of the cylindrical extension 42 and a circular shoulder 48 carried by and rigid with the piston rod 18. The width of the channel 44, measured along the axis of the body 10, is greater than the cross-sectional size of the ring 46. The ring 46 can thus move within the channel 44 from the position shown in FIG. 1 to a position in which it abuts the shoulder 48.

The shoulder 48 is provided with a radial groove 50 which connects with an axial groove 52 in the base of the circular channel 44.

The cylindrical body 10 is also provided with a cylindrical insert 56 defines a chamber 57 and is rigid with and sealed to the inside of the body 10. The insert 56 provides a cylindrical inside wall 58 having a portion 58A which is smooth and uninterrupted and a portion 58B in which is formed a longitudinal groove 60 (see FIG. 3 also).

The whole of the interior of the body 10 is filled with gas, such as nitrogen, under pressure.

The operation of the gas spring of FIG. 1 will now be described, with particular reference to FIGS. 4–7. It will initially be assumed that the hatchback (or other closure member to which the gas spring is attached and whose movement is to be controlled) is closed, so that the piston 26 is at the left hand end of the cylindrical body 10, as viewed in FIG. 1 and the piston rod 18 is substantially retracted into the body. When the hatchback is unlatched and raised slightly, the gas pressure within the body 10 causes the piston 26, and thus the piston rod 18, to move to the right, the gas pressure exerting a greater force on the face of the piston cap 38, and on the head of the piston rod 18 extending through the cap, than on the underside of the piston, because of the greater surface area of the cap 38 and the head of the piston rod.

As the piston rod 18 moves to the right, the hatchback will thus be raised towards its open position. This movement is controlled by the groove 36 which allows gas to pass from the chamber 34 into the chamber 32 and prevents a build-up of gas pressure within the chamber 34 which would otherwise occur and would stop movement of the piston. The tapering section of the groove 36 enables the speed of movement of the piston rod 18, and thus the hatchback, to be controlled in a desired manner.

Figure 4:
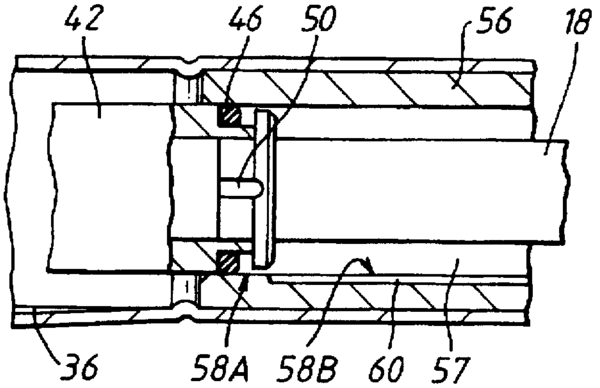
FIGS. 4,5,6 and 7 are partial longitudinal sections corresponding to FIG. 1 but showing the gas spring in different opening and closing positions.
Figure 5:
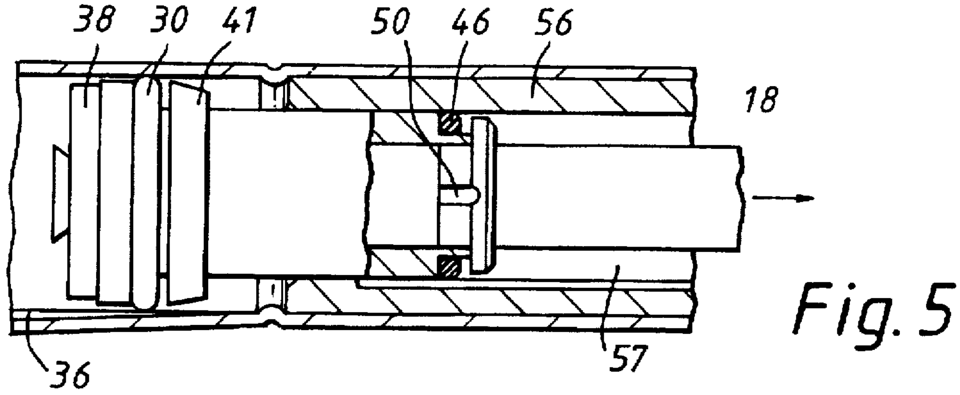

As movement of the piston and the piston rod 18 to the right continues, the cylindrical extension 42 carried by the piston will enter the chamber 57 within the cylindrical extension 56. The frictional force between the sealing ring 46 and the uninterrupted surface 58A of the chamber 57 will cause the sealing ring 46 to assume a position at the left-hand end of the groove 44, as shown in FIGS. 1 and 4. In this position, the chamber 57 is completely sealed from the chambers 34 and 32. The sealing ring 46, being in the position illustrated, closes off any communication between the chambers 57 and 34 through the grooves 50 and 52. Because the chamber 57 is completely sealed off, the gas within it will be compressed and will exert a force on the shoulder 48. The lifting force exerted on the hatchback by the gas spring is consequently reduced. The weight of the hatchback thus arrests movement of the piston rod 18 and the piston 26 at an intermediate position between the fully extended and fully retracted positions. The hatchback thus stops at the corresponding position. In this way, the gas spring ensures that the hatchback is lifted (after unlatching and slight manual raising), without effort on the part of the user, but does not open fully. This is advantageous in many situations: for example, it will prevent damage to the hatchback if the vehicle is parked in a position where available height is restricted, such as in a garage or a public car park building, or where the user's height is such that the full opening of the hatchback is inconvenient.

At the intermediate position of the piston 26 and the piston rod 18, the sealing ring 30 is positioned at the point 36A of the groove 36.

Figure 6:
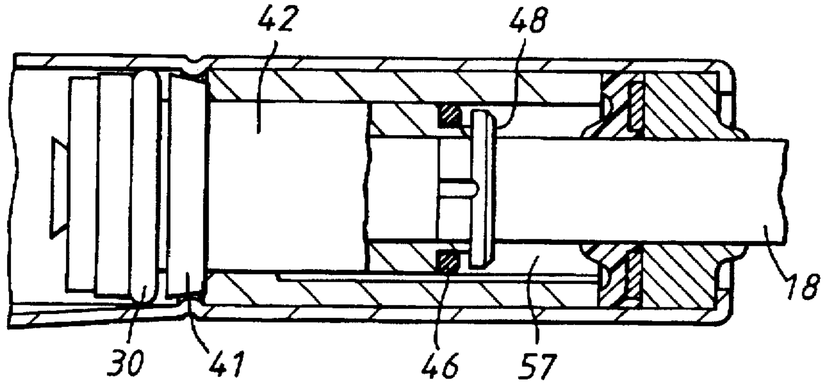

If the user wishes to open the hatchback fully, it is merely necessary to apply a slight upward lift to the hatchback. The force exerted by the gas pressure in the spring is now greater than the force exerted by the hatchback and further movement of the piston and piston rod to the right (as viewed in FIG. 1) takes place. Once this movement has become such that the sealing ring 46 and the groove 44 are positioned within the grooved area 58B (see FIG. 1 and FIG. 5) of the chamber 57, the gas within the chamber 57 and on the right hand side of the circular shoulder 48 can now pass into the chamber 34 through the groove 60, and between the sliding surfaces of the exterior of the cylindrical extension 42 and the interior wall portion 58A of the chamber 57. Because such gas movement is possible, the gas pressure in the spring causes movement of the piston 26, and thus the piston rod 18, to accelerate and the hatchback is lifted to its fully opened position as illustrated in FIG. 6; in the fully open position, the shoulder 41 abuts against the end of the cylindrical insert 56.

During movement of the piston 26 from the intermediate position to the fully open position, the portion 36B of the groove 36 allows transfer of gas pressure from chamber 34 to chamber 32.

Figure 7:
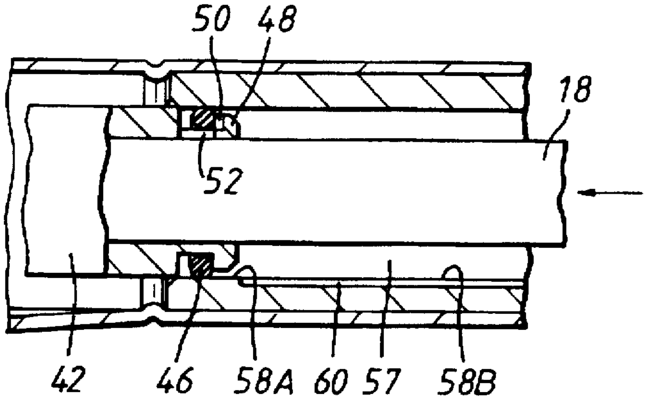

In order to close the hatchback, the user applies a manual closing force which moves the piston rod 18 and the piston 26 to the left. During the initial part of this movement, gas flow can take place from chambers 32 and 34 into chamber 57 through the grooves 36 and 60. The frictional force between the ring 46 and the wall 58 of the chamber 57 moves the ring 46 to the right, within the channel 44—as shown in FIG. 7. When the piston rod has moved sufficiently to the left so that the circular channel 44 and the sealing ring 46 become aligned with the wall portion 58A of the chamber 57, gas movement from chamber 57 into chamber 34 continues, but now takes place through grooves 50 and 52 because the ring 46 no longer blocks gas flow through these grooves, and thence between the sliding surfaces of the exterior of the cylindrical extension 42 and the interior wall of the chamber 57.

The hatchback can of course be closed from the intermediate stopping point.

It will be appreciated that various modifications can be made. For example, the cylindrical extension 42 need not be solid with the piston 26, though must seal against the external surface of the piston rod 18. In a modification, the extension 42 need not have the same diameter along its length: its end adjacent channel 44 can have the diameter illustrated but the portion between that end and the piston can be of reduced diameter.

The speed of movement of the piston and piston rod during the opening process can be controlled by appropriate dimensioning of the grooves 36 and 60.

When piston 26 moves to the left (as viewed in FIG. 1) during closure of the hatchback, additional transfer of gas between chambers 32 and 34 can take place under the sealing ring 30 (FIG. 1). The sealing ring 30 is moved to the right hand side of groove 28 by the frictional force acting on it, and this allows the gas to enter the groove 28 between the groove and the ring 30, then pass under the ring and thence into chamber 34 via bores 43.

Figure 8:
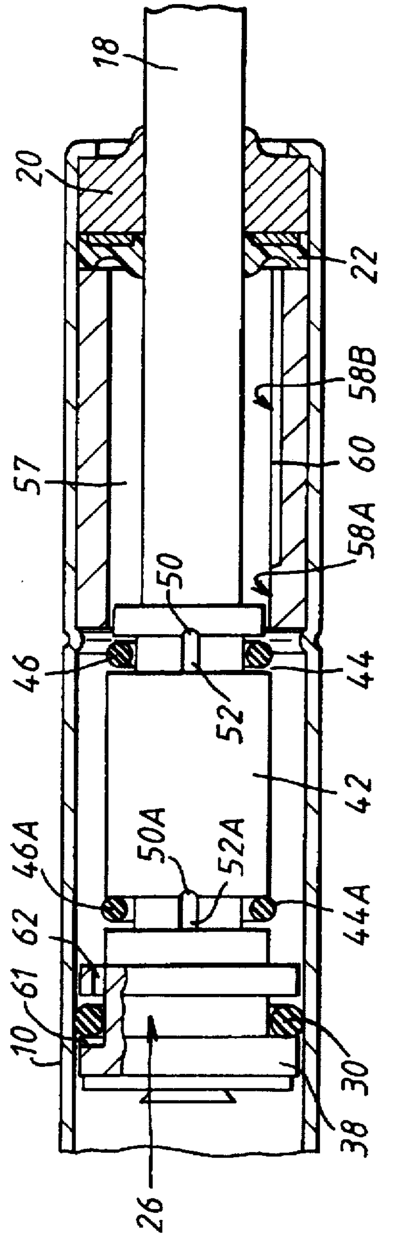
FIG. 8 is a partial longitudinal section corresponding to FIG. 1 but showing a modification.

FIG. 8 shows a modified form of the gas spring of FIG. 1. The groove 36 is omitted. During opening movement, when the piston 26 and piston rod 18 move to the right, gas transfers from chamber 34 to chamber 32 via bores 62 under the ring 30, and thence through a bore 61, the bore 61 thus regulating the speed of movement. When the piston 26 and piston rod 18 move in the opposite direction, during closing of the hatchback, the ring 30 moves to the right in groove 28 and allows rapid transfer of gas between chambers 32 and 34 via the gap between the left hand side of ring 30 and the adjacent wall of the groove 28, thence under ring 30 and through bores 62.

In addition, the gas spring of FIG. 8 has an additional channel 44A formed in the cylindrical extension 42, this channel 44A corresponding to channel 44 and carrying a ring seal 46A corresponding to ring seal 46. Grooves 50A and 52A, corresponding to grooves 50 and 52, are also provided. During opening movement, when the piston 26 and piston rod 18 move to the right, the sealing ring 46A comes into contact with the wall portion 58A of the cylindrical insert 56 just before the finally open position. The piston and piston rod are therefore arrested smoothly by gas pressure instead of abruptly by metal to metal abutment.

During return of the piston and piston rod, the sealing ring 46A allows gas to flow through grooves 50A and 52A in the same way as described above for grooves 50 and 52.

The length of the cylindrical extension 42 determines the position at which intermediate halting of the hatchback takes place and also the fully open position of the hatchback. However, the position, within the full stroke of the piston, at which intermediate halting of the hatchback takes place, can of course be adjusted by adjustment of the location of the uninterrupted wall portion 58A of the cylindrical insert 56. FIG. 9 shows a modification in which an additional grooved portion 58C of the interior wall of the chamber 57 is provided so that the uninterrupted wall portion 58A is positioned at an intermediate location along the length of the chamber 57. The grooved portion 58C incorporates a groove 70. During the opening process, therefore, the piston and piston rod will continue to move to the right when the shoulder 48 of the cylindrical extension 42 has entered the chamber 57, this continued movement being permitted by the groove 70 allowing transfer of gas between chambers 57 and 34. However, when the sealing ring 46 comes into contact with the uninterrupted wall portion 58A (FIG. 9) of the chamber 57, the consequent build-up in gas pressure within the chamber 57 stops movement of the piston and piston rod, and the hatchback is thus halted in the intermediate position. Operation thereafter is the same as described with reference to FIG. 1. The groove 70 reduces the speed of the piston and piston rod before the intermediate stopping point of the hatchback.

Figure 10:
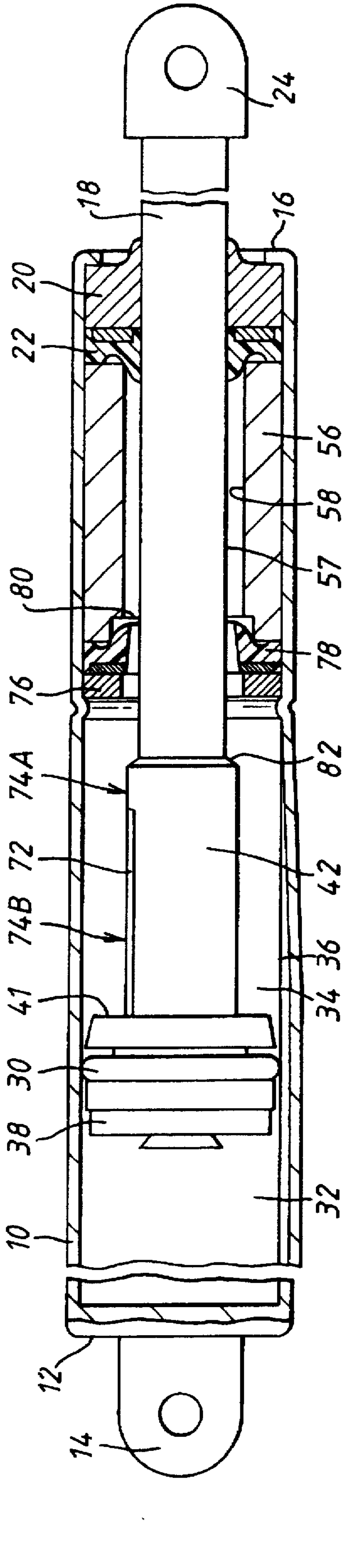
FIG. 10 is a longitudinal section through yet another modified form of the gas spring of FIG. 1.

FIG. 10 shows a modified form of the gas spring, in which parts corresponding to those in the other Figures are correspondingly referenced.

In the gas spring of FIG. 10, the cylindrical extension 42 is not provided with the channel 44 or the sealing ring 46 of FIG. 1. Instead, its external surface has a groove 72 in its external surface which extends for part, only, of its external surface. The external surface of the cylindrical extension 42 thus has an uninterrupted surface portion 74A and an interrupted portion 74B corresponding to the groove 72.

In addition, the cylindrical extension 56 is modified. At its open end, a rigid ring 76 is provided. Between the ring 76 and the end of the insert 56, a sealing ring 78 is positioned which carries a flexible circular sealing lip 80 in contact with the external surface of the piston rod 18.

The operation of the gas spring during initial opening movement is the same as described with reference to FIG. 1. The gas pressure within the cylindrical body 10 causes the piston 26, and thus the piston rod 18, to move to the right, pressure build-up within chamber 34 and 57 being prevented by transfer which takes place through groove 36.

However, when the distal end 82 of the cylindrical extension 42 enters the chamber 57, the circular sealing lip 80 will form an airtight seal with the uninterrupted portion 74A of the surface of the extension 42. Gas pressure will thus build-up within chamber 57, the gas being unable to escape. Movement of the piston and piston rod thus stops, and the hatchback is halted in the intermediate position.

The hatchback can be raised to the fully opened position by temporary application of an upward force on the hatchback by the user. This moves the piston rod 18 to the right so that the grooved portion 74B of the surface of the extension 42 now becomes aligned with the sealing lip 80. Transfer of gas from chamber 57 into chamber 34 can thus take place through groove 72. Gas pressure build-up in chamber 57 is therefore now prevented and the gas spring lifts the hatchback to the fully open position.

In order to close the hatchback, the user applies the necessary downward force which moves the piston 26 and the piston rod 18 to the left as viewed in the Figure. Gas transfer between the three chambers 32,34 and 57 takes place via groove 36 and 72. Gas transfer continues to take place when the uninterrupted surface portion 74A of the cylindrical extension 42 becomes aligned with the circular sealing lip 80, because the sealing lip is arranged so that it does not provide an effective seal when the piston rod is moving to the left (but only when it is moving in the opposite direction).

What is claimed is:

1. A gas compression spring for moving a member relative to a body from a first position corresponding to compression of the spring to a second position, comprising a piston-cylinder arrangement with a piston rod slidingly and sealingly extending outwardly of a first one of the two ends of the cylinder and terminating in a distal end outside the cylinder;

the distal end of the piston rod and the second one of the ends of the cylinder being opted for connection between the body and the member;

the interior of the cylinder being filled with gas under pressure;

piston means carried by the piston rod and slidable within the cylinder;

first gas flow means providing a restrictive gas flow path permitting limited flow of gas from one side of the piston means to the other as the gas pressure exerted on the piston rod moves the piston rod from an piston rod position towards an outer piston rod position more outwardly from the cylinder, whereby to move the member towards the second position;

gas flow blocking means operated by the piston means when the piston rod has reached an intermediate position between the inner and outer piston rod positions to cause a block in the said gas flow path and thereby to cause a pressure build-up halting movement of the piston rod at the intermediate position;

second gas flow means operative when a change in an external force applied to the piston rod has caused the piston rod to move further outwardly of the cylinder to unblock the said gas flow path whereby to allow the piston rod to move into the said outer piston rod position;

the piston means comprising first and second pistons, the first piston dividing the interior of the cylinder into a first chamber closed by the head of the first piston and a second chamber through which the piston rod extends and in which the second piston is positioned;

means defining a third chamber in which the second piston reaches a predetermined position when the piston rod has reached the intermediate position;

the first gas flow means including first interconnection means interconnecting the third chamber and the second chamber and second interconnection means interconnecting the second and first chambers;

the gas flow blocking means comprising sealing means carried by the second piston to form a gas-tight seal which seals off the third chamber from the second chamber when the second piston reaches the predetermined position within the third chamber thereby blocking the passage of gas through the first interconnection means, whereby to produce the said pressure build-up in the third chamber and thus a corresponding force opposing the force which is produced by the gas pressure in the first and second chambers and which tends to move the piston rod to the outer piston rod position;

the third chamber having an open end comprising the first interconnection means and into and through which the piston rod extends, the third chamber having a first interior wall surface portion against which the sealing means makes gas-tight sealing contact when the second piston is in the said predetermined position, the third chamber having a second interior wall surface portion which is spaced beyond the said predetermined position in the direction towards the first end of the cylinder, the second wall surface portion defining the said second gas flow means which provides a gas flow path by-passing the sealing means when the second piston has moved further into the third chamber beyond the predetermined position; and pressure release means carried by the second piston and operative when the piston rod is moving inwardly of the cylinder from the outer piston rod position under the application of an externally applied force to provide a by-pass flow path by-passing the sealing means when the second piston moves into the predetermined position, whereby to prevent pressure build-up opposing such movement.

2. A gas spring according to claim 1, in which the gas flow path by-passing the sealing means comprises a groove in the second wall surface portion.

3. A gas spring according to claim 1, in which the pressure release means comprises groove means carried by the second piston and extending from the side of the sealing means closer to the third chamber to the side thereof closer to the second chamber, the sealing means being movable between a first position in which it closes the groove means and a second position in which it opens the groove means, the sealing means being urged into its first position by frictional contact between the sealing means and the first wall surface portion of the third chamber when the piston rod is moving from the inner piston rod position towards the outer piston rod position, the sealing means being urged into its second position by frictional contact between the sealing means and the first wall surface portion of the third chamber when the piston rod is moving from the outer piston rod position towards the inner piston rod position.

4. A gas spring according to claim 1, in which the means defining the third chamber is a separate cylindrical insert and in that the third chamber has a smaller internal diameter than the first and second chambers.

5. A gas spring according to claim 1, in which the second interconnection means of the first gas flow means includes a groove positioned in the wall of the cylinder and interconnecting the first and second chambers.

6. A gas spring according to claim 1, in which the first piston comprises a circumferential seal sealing against the interior of the cylinder, and the second interconnection means of the first gas flow means comprises means defining a passageway for by-passing the circumferential seal and interconnecting the first and second chambers.

7. A gas compression spring for moving a substantially horizontally pivotted closure member on an automobile body from a fully closed position corresponding to compression of the spring to a fully open position, comprising:

a cylinder having a first, closed-off, end carrying a fixture for connecting the cylinder to one of the body and the closure member and a second, opposite, end;

a piston rod sealingly protruding through the opposite end of the cylinder and carrying a fixture for connecting the piston rod to the other of the body and the closure member, the piston rod being connected to a piston slidable within the cylinder, the piston having a head defining a first chamber in the cylinder between the head of the piston and the first cylinder end, the piston defining a second chamber through which the piston rod extends;

means in the cylinder defining a third chamber nearer to the second end of the cylinder than the second chamber;

the third chamber having an open mouth communicating with the second chamber and through which mouth the piston rod extends;

the interior of the cylinder being charged with gas under pressure so that the force of the gas moves the piston rod from a retracted position inwardly of the cylinder towards an extended position;

first gas flow means providing a first restricted gas flow path allowing gas to flow from the second chamber to the first chamber to facilitate such movement;

a sealing ring mounted to extend sealingly round the piston rod and means defining a smooth interior wall surface portion forming part of the interior surface of the third chamber, the smooth interior wall surface portion being so positioned that it and the sealing ring act mutually to form a temporary seal which seals off the interior of the third chamber from the second chamber when the piston rod in moving towards the extended position has reached a predetermined intermediate position between the retracted and extended positions, whereby the resulting build-up of gas pressure within the third chamber stops further movement of the piston rod towards the extended position; and means defining a longitudinally extending groove in a second interior wall portion of the third chamber, the second interior wall portion being positioned closer to the second end of the cylinder than the smooth interior wall surface portion, the groove providing a second restricted gas flow path which connects the interior of the third chamber to the second chamber when the piston rod has been moved beyond the predetermined position towards the extended position by an externally applied farce, whereby gas flow from the third chamber to the second chamber is permitted by the second gas flow means and causes the gas pressure within the interior of the cylinder to move the piston rod into the extended position.

8. A gas spring according to claim 7, in which the first gas flow means comprises a groove positioned in the wall of the cylinder.

9. A gas spring according to claim 7, including pressure release means operative when the piston rod is moving inwardly of the cylinder from the said extended position under the application of an externally applied force to provide a by-pass flow path by-passing the sealing ring when the piston rod moves into the predetermined position during such movement, whereby to prevent pressure build-up opposing such movement.

10. A gas spring according to claim 9, in which the by-pass means comprises groove means carried by the piston rod and extending from the side of the sealing ring closer to the third chamber to the side thereof closer to the second chamber, the sealing ring being movable between a first position in which it closes the groove means and a second position in which it opens the groove means, the sealing ring being urged into its first position by frictional contact between the sealing ring and the smooth interior surface portion of the third chamber when the piston rod is moving from the retracted position towards the extended position, the sealing ring being urged into its second position by frictional contact between the sealing ring and the smooth interior surface portion of the third chamber when the piston rod is moving in the opposite direction.

11. A gas spring according to claim 7, in which the means defining the third chamber comprises a separate cylindrical insert.

12. A gas compression spring for moving a member relative to a body from a first position corresponding to compression of the spring to a second position, comprising a piston-cylinder arrangement with a piston rod slidingly and sealingly extending outwardly of a first one of the two ends of the cylinder and terminating in a distal end outside the cylinder;

the distal end of the piston rod and the second one of the ends of the cylinder being adapted for connection between the body and the member;

the interior of the cylinder being filled with gas under pressure;

piston means carried by the piston rod and slidable within the cylinder;

first gas flow means providing a restrictive gas flow path permitting limited flow of gas from one side of the piston means to the other as the gas pressure exerted on the piston rod moves the piston rod from an inner piston rod position towards an outer piston rod position more outwardly from the cylinder, whereby to move the member towards the second position;

gas flow blocking means operated by the piston means when the piston rod has reached an intermediate position between the inner and outer piston rod positions to cause a block in the said gas flow path and thereby to cause a pressure build-up halting movement of the piston rod at the intermediate position;

second gas flow means operative when a change in an external force applied to the piston rod has caused the piston rod to move further outwardly of the cylinder to unblock the said gas flow path whereby to allow the piston rod to move into the said outer piston rod position;

the piston means comprising first and second pistons, the first piston dividing the interior of the cylinder into a first chamber closed by the head of the first piston and a second chamber through which the piston rod extends and in which the second piston is positioned;

means defining a third chamber in which the second piston reaches a predetermined position when the piston rod has reached the intermediate position;

the first gas flow means including first interconnection means interconnecting the third chamber and the second chamber and second interconnection means interconnecting the second and first chambers;

the gas flow blocking means comprising sealing means carried by the second piston to form a gas-tight seal which seals off the third chamber from the second chamber when the second piston reaches the predetermined position within the third chamber thereby blocking the passage of gas through the first interconnection means, whereby to produce the said pressure build-up in the third chamber and thus a corresponding force opposing the force which is produced by the gas pressure in the first and second chambers and which tends to move the piston rod to the outer piston rod position; and pressure release means carried by the second piston and operative when the piston rod is moving inwardly of the cylinder from the outer piston rod position under the application of an externally applied force to provide a by-pass flow path by-passing the sealing means when the second piston moves into the predetermined position, whereby to prevent pressure build-up opposing such movement;

the pressure release means comprising groove means carried by the second piston and extending from the side of the sealing means closer to the third chamber to the side thereof closer to the second chamber, the sealing means being movable between a first position in which it closes the groove means and a second position in which it opens the groove means, the sealing means being urged into its first position by frictional contact between the sealing means and the first wall surface portion of the third chamber when the piston rod is moving from the inner piston rod position towards the outer piston rod position, the sealing means being urged into its second position by frictional contact between the sealing means and the first wall surface portion of the third chamber when the piston rod is moving from the outer piston rod position towards the inner piston rod position.

13. A gas spring according to claim 12, in which the third chamber has an open end comprising the first interconnection means and into and through which the piston rod extends, the third chamber having a first interior wall surface portion against which the sealing means makes gas-tight sealing contact when the second piston is in the said predetermined position, the third chamber having a second interior wall surface portion which is spaced beyond the said predetermined position in the direction towards the first end of the cylinder, the second wall surface portion defining the said second gas flow means which provides a gas flow path by-passing the sealing means when the second piston has moved further into the third chamber beyond the predetermined position.

14. A gas spring according to claim 13, in which the gas flow path by-passing the sealing means comprises a groove in the second wall surface portion.

15. A gas spring according to claim 12, in which the pressure release means comprises groove means carried by the second piston and extending from the side of the sealing means closer to the third chamber to the side thereof closer to the second chamber, the sealing means being movable between a first position in which it closes the groove means and a second position in which it opens the groove means, the sealing means being urged into its first position by frictional contact between the sealing means and the first wall surface portion of the third chamber when the piston rod is moving from the inner piston rod position towards the outer piston rod position, the sealing means being urged into its second position, by frictional contact between the sealing means and the first wall surface portion of the third chamber when the piston rod is moving from the outer piston rod position towards the inner piston rod position.

16. A gas spring according to claim 12, in which the means defining the third chamber is a separate cylindrical insert and in that the third chamber has a smaller internal diameter than the first and second chambers.

17. A gas spring according to claim 12, in which the first gas flow means includes a groove positioned in the wall of the cylinder and interconnecting the first and second chambers.

18. A gas spring according to claim 12, in which the first piston comprises a circumferential seal sealing against the interior of the cylinder, and the first gas flow means comprises means defining a passageway by-passing the circumferential seal and interconnecting the first and second chambers.

* * * * *